United States Patent [19]

Schwab

[11] 3,979,366

[45] Sept. 7, 1976

[54] VINYL CHLORIDE SUSPENSION POLYMERIZATION

[75] Inventor: Peter A. Schwab, Ponca City, Okla.

[73] Assignee: Continental Oil Company, Ponca City, Okla.

[22] Filed: June 12, 1975

[21] Appl. No.: 586,474

[52] U.S. Cl. ................................ 526/345; 526/72; 526/230; 526/321
[51] Int. Cl.² ................ C08F 218/14; C08G 63/00; C08F 214/00; C08F 114/02
[58] Field of Search ............... 260/78.5 CL, 87.5 E, 260/92.8 W

[56] References Cited
UNITED STATES PATENTS

| | | | |
|---|---|---|---|
| 2,897,169 | 7/1959 | Dazzi | 260/78.5 CL |
| 3,141,850 | 7/1964 | Lybeck | 260/884 |
| 3,230,203 | 1/1966 | Kuhne | 260/80.71 |
| 3,539,488 | 10/1970 | Klopfer et al. | 260/899 |

*Primary Examiner*—Joseph L. Schofer
*Assistant Examiner*—Herbert J. Lilling
*Attorney, Agent, or Firm*—Cortlan R. Schupbach, Jr.

[57] ABSTRACT

An improved process for the suspension polymerization of vinyl chloride homopolymers is accomplished by the addition of small amount of chain extending agent to the polymerization formula allowing the polymerization to be run at a higher temperature thus making better use of the reactor's heat removal capability. More efficient use of initiator is also accomplished while producing polyvinyl chloride having the desired molecular weight dependent physical properties. The process also allows a faster rate of polymerization.

3 Claims, No Drawings

VINYL CHLORIDE SUSPENSION POLYMERIZATION

This invention relates to an improved method for the suspension polymerization of vinyl chloride. More particularly, it relates to improving the polymerization rate while maintaining the physical properties of suspension polymerized polyvinyl chloride.

Many patents and papers disclose mixtures of vinyl chloride monomer and cross-linking agents as curable compositions (U.S. Pat. No. 3,141,850; 3,351,604; 3,496,253; and 3,539,488). Other patents disclose the preparation of copolymers using cross-linking agents, (3,230,203). Normally, however, the cross-linking agent is used to counteract the adverse effects of the comonomer on the copolymer. Cross-linking agents have also been used in suspension polymerization as comonomers with vinyl chloride monomer as described in U.S. Pat. No. 2,875,186. However, the prior art procedures still result in restriction to a temperature range up to about 132°F in order to obtain polyvinyl chloride having the desired molecular weight dependent physical characteristics.

It would be greatly desirable if a method were available to utilize the higher heat capacity of the suspension polymerization reactor used in the polymerization of vinyl chloride.

It is therefore an object of the present invention to provide a process which will improve the suspension polymerization of vinyl chloride homopolymer by allowing the polymerization to be carried out at higher temperatures with concurrent faster polymerization rates while still maintaining the desired molecular weight dependent physical properties formerly obtained from polyvinyl chloride using prior art lower polymerization temperatures. Other objects will become apparent to those skilled in this art as the description proceeds.

It has now been discovered in accordance with the present invention that the addition of a small amount of a chain-extending agent to the suspension polymerization with the initial charge of vinyl chloride monomer allows the polymerization to be run at a higher temperature, thus utilizing the polymerization reactors heat removal capability while making more efficient use of the initiator decomposition, the combination provides a faster rate of polymerization. The desired physical properties dependent upon molecular weight are maintained even though a higher polymerization temperature is employed. Higher production rates are therefore obtained.

The temperature of the improved process can vary from about 120°F to about 160°F, although temperatures from 135°F to about 150°F are preferred. The higher temperatures are offset by the use of a cross-linking agent.

The cross-linking agent (sometimes referred to herein as chain-extending agent) is useful at a concentration of from 100 to 1,000 parts per million. However, from 300 to 500 parts per million are preferred. The concentration of cross-linking agent is directly dependent upon the temperature of polymerization. As the temperature rises, so does the amount of cross-linking agent.

Representative examples of cross-linking agents useful in the practice of the present invention are triallyl isocyanurate (TAIC), diallyl maleate (DAM), diallyl phthalate (DAP).

In the polymerization of homopolymers of polyvinyl chloride, the molecular weight of the resulting homopolymer is inversely dependent of the polymerization temperature. When a chain-extending agent used is a polyfunctional monomer, the monomer acts to create extended chains which are larger than would be formed in a reaction run without the chain-extending agent. At a constant polymerization temperature, the addition of small amounts of chain-extending agent produces polyvinyl chloride homopolymers having higher molecular weights. These higher molecular weights are determined by specific viscosity tests carried out in solution and in a Brabender equivalency test.

The invention is more concretely described with reference to the examples below wherein all parts and percentages are by weight unless otherwise specified. The examples are intended to be illustrative only and should not be construed to limit the invention.

EXAMPLE 1

Addition of varying amounts of TAIC to the suspension polymerization of vinyl chloride homopolymers was carried out at 130°F in an 8-gallon stainless steel reactor using 200 phm (parts per hundred monomer) of deionized water, 100 phm of vinyl chloride monomer, 0.106 parts per hundred monomer of Methocel 60HG15 (suspending agent provided by Dow Chemical Company), 0.053 parts per hundred monomer secbutyl peroxydicarbonate down to a pressure of 90 pounds per square inch gauge (PSIG). The initial reactor pressure was about 120 PSIG.

Solution specific viscosity tests were carried out using 0.4 grams of the polyvinyl chloride homopolymer produced in the above reaction dissolved in 100 mililiters of nitrobenzene at 25°C.

Brabender (plasticorder manufactured by Brabender, Inc.) equivalent specific viscosities were obtained by measuring the equilibrium torque of several standard resins having different molecular weights and plotting the results versus true specific viscositites to give a straight line. The equilibrium torque of the experimental resins was then measured and the apparent specific viscosity was read from the plot.

In Table I below, the results of varying amounts of TAIC is shown. The symbol $d$ indicates that the polyvinyl chloride produced was insoluble in nitrobenzene, while the symbol $e$ shows that the polyvinyl chloride would not fuse in the Brabender and no specific viscosity results were obtainable.

TABLE I

VARYING AMOUNTS OF TAIC

| Run No. | TAIC (ppm) | Solution Specific Viscosity | Brabender-Equivalent Specific Viscosity |
|---|---|---|---|
| 1 | 0 | 0.377 | 0.376 |
| 2 | 100 | 0.416 | 0.391 |
| 3 | 250 | 0.425 | 0.395 |
| 4 | 500 | 0.514 | 0.468 |
| 5 | 750 | 0.727 | (e) |
| 6 | 1000 | (d) | (e) |
| 7 | 1250 | (d) | (e) |

An examination of the Table I data shows that as the amount of cross-linking agent is increased, the molecular weight of the resulting resin increases. The Brabender equilibrium torque measurements show that the experimental resins possess fusion properties somewhere between those expected from their solution viscosities and those expected from their polymerization temperatures. This would indicate a high molecular weight polyvinyl chloride is made at a high polymerization temperature by the addition of a chain extending or cross-linking agent such as TAIC.

EXAMPLE 2

The suspension polymerization of vinyl chloride with various amounts of TAIC at different polymerization temperatures was carried out in a 75-gallon stainless steel reactor using 1.8 phm of deionized water, 100 phm of vinyl chloride monomer, 0.08 parts per hundred monomer of Methocel 90HG35 suspending agent (produced by Dow Chemical Conpany), sec-butyl peroxydicarbonate at 132°F and at 143°F. Another run was made using .061 parts per hundred monomer of 2-ethylhexyl peroxydicarbonate at 137°F. All runs were carried out down to 90 pounds per square inch gauge pressure. The initial reaction pressure was about 120 PSIG. Optimum temperature 1 unit cooling capacity was determined for each chain-extending agent used. The results are shown in Table II below.

TABLE II

| Run No. | Polymerization Temperature (°F) | TAIC (ppm) | Hours to 85% Polymerization | Solution Specific Viscosity | Brabender Equilibrium Torque (meter-grams) |
|---|---|---|---|---|---|
| 8 | 132 | 0 | 5¼ | 0.381 | 1980 |
| 9 | 137 | 340 | 4½ | 0.397 | 1950 |
| 10 | 143 | 500 | 4½ | 0.401 | 1975 |

Table II indicates that by using higher polymerization temperatures with the addition of a crosslinking agent, polyvinyl chloride homopolymer can be made with an equilibrium torque equal to polyvinyl chloride homopolymer made under prior art conditions at a lower temperatures without the cross-linking agent. The polyvinyl chloride from Runs 8 and 9 were separated, dry blended into a pipe compound and extruded into a pipe. No differences between the two pipes could be determined.

EXAMPLE III

A plant size trial was made in glass lined 2200-gallon reactors. The polyvinyl chloride was made using 340 parts per million TAIC at 137°F and had a specific viscosity of .401. The following fusion properties comparing the polyvinyl chloride made with TAIC versus one made without the cross-linking agent was compiled. Color and sticking tests results are subjective comparisons of the two polymers. The results are shown in Table III below.

TABLE III

| Physical Properties | TAIC-Made PVC | Standard PVC |
|---|---|---|
| $T_1$ Time to Fusion (min.) | 2.4 | 1.4 |
| $T_2$ Time to Degradation (min.) | 8.8 | 7.5 |
| $T_2-T_1$ | 6.4 | 6.1 |
| Equilibrium Torque (meter-grams) | 2025 | 2050 |
| Fusion Torque (meter-grams) | 2800 | 3250 |
| Color | sandy | dark gray |
| Sticking | none | moderate |
| Stock Temperature (°C) | 207 | 207 |

The resins shown in Table III were then formulated into a standard pipe compound and extruded into 2-inch pipe. Both compounds extruded well and produced good quality pipe.

Theoretical calculations were performed which indicate the reduction of polymerization time. Cooling capacity of the plant reactors was estimated from the plant data. At a polymerization temperature of 132°F, the best polymerization time obtainable was about 5 and ¼ hours. From calculations, it can be shown that the most efficient temperature of a particular initiator (such as 2-ethylhexyl peroxydicarbonate) to polymerize vinyl chloride into a homopolymer would be 137°F. Using such an initiator, the best polymerization time would be about 4 and ½ hours. Thus, there would be a decrease of about ¾ of an hour (14 percent) in polymerization time, thus allowing greater productivity in the plant and a greater utilization of both the heat capacity of the heat reactor and decomposition temperature of the initiators.

While certain embodiments and details have been shown for the purpose of illustrating this invention, it will be apparent to those skilled in this art that various changes and modifications may be made herein without departing from the spirit or the scope of the invention.

I claim:

1. An improved method for the production polyvinyl chloride homopolymer by suspension polymerization of vinyl chloride monomer, the improvement comprising carrying out the entire polymerization in the presence of about 300 to 500 parts per million of a chain-extending agent selected from the group consisting of diallyl maleate, triallyl isocyanurate, and diallyl phthalate while using elevated temperatures and reduced polymerization times.

2. A method as described in claim 1 wherein the reaction is carried out at a temperature of from about 120° to 160°F.

3. A method as described in claim 1 wherein the polymerization time is about 4 ½ hours.

* * * * *